United States Patent [19]

Strouth

[11] Patent Number: 5,344,167
[45] Date of Patent: Sep. 6, 1994

[54] SKI SLED

[76] Inventor: John E. Strouth, 3070 Larch La., Plymouth, Minn. 55441

[21] Appl. No.: 50,707

[22] Filed: Apr. 21, 1993

[51] Int. Cl.⁵ .......................................... B62B 13/12
[52] U.S. Cl. .................................. 280/14.1; 280/22.1
[58] Field of Search .................... 280/606, 818, 14.1, 280/14.3, 16, 21.1, 22, 22.1, 25, 26, 28.16, 28.15

[56] References Cited

U.S. PATENT DOCUMENTS

| | | | |
|---|---|---|---|
| 1,160,569 | 11/1915 | Bourdon et al. | 280/22.1 |
| 1,310,252 | 7/1919 | Seifert | 280/22.1 X |
| 1,313,502 | 8/1919 | Pangborn . | |
| 2,209,830 | 7/1940 | Saari | 280/14.1 |
| 3,107,923 | 10/1963 | Nuss . | |
| 3,528,674 | 9/1970 | Schwarz | 280/22.1 |
| 3,799,564 | 3/1974 | Eisenschmid | 280/14.1 |
| 3,900,208 | 8/1975 | Hjelmquist | 280/16 |
| 4,097,055 | 6/1978 | Laycraft | 280/16 |
| 4,114,912 | 9/1978 | Sweeney | 280/28.15 |
| 4,336,950 | 6/1982 | Zepkowski | 280/16 |
| 4,349,209 | 9/1982 | Chilzer . | |
| 4,357,036 | 11/1982 | Zepkowski . | |
| 4,537,412 | 8/1985 | Hill | 280/7.2 |
| 4,632,408 | 12/1986 | Oipp et al. . | |
| 4,773,659 | 9/1988 | Rygiel | 280/16 X |
| 4,775,161 | 10/1988 | Bridges | 280/16 |
| 4,796,902 | 1/1989 | Capra . | |
| 5,000,466 | 3/1991 | Den Hartog | 280/21.1 |
| 5,143,395 | 9/1992 | Mayr | 280/607 X |

FOREIGN PATENT DOCUMENTS

| | | | |
|---|---|---|---|
| 0149953 | 7/1985 | European Pat. Off. | 280/14.1 |
| 193810 | of 1938 | Fed. Rep. of Germany | 280/14.1 |
| 746677 | 8/1944 | Fed. Rep. of Germany | 280/14.1 |
| 0742782 | 3/1933 | France | 280/21.1 |
| 1265693 | 5/1961 | France . | |
| 1578848 | 7/1969 | France . | |
| 0499656 | 6/1956 | Italy | 280/22.1 |

Primary Examiner—Brian L. Johnson
Attorney, Agent, or Firm—Merchant, Gould, Smith, Edell, Welter & Schmidt

[57] ABSTRACT

A ski sled is shown which has a seat platform carrying a seat, the platform being mounted by flexible support members to a pair of spaced, parallel skis so that the skis can be tilted with respect to the platform. A pair of steering members pivotally connected by a transverse member are connected to the skis to permit an operator to tilt the skis. A brake member is mounted on the ski sled which can be moved into and out of engagement with a ground surface.

10 Claims, 5 Drawing Sheets

SKI SLED

BACKGROUND OF THE INVENTION

1. Field of the Invention

This invention relates to a ski sled which combines the thrill of skiing with the safety and ease of operation of a sled wherein a seated operator can control the direction of the ski sled by tilting the skis and can operate a brake to slow down or stop the ski sled.

2. Description of the Prior Art

Those interested in winter sports often start sledding as children. A sled is easy and safe to operate but a typical sled with steel runners is hard to steer and does not function very well on many surfaces such as deep, soft snow. Therefore, most people who want to continue with outdoor activities learn to ski because that offers greater variety and more excitement. Not everyone can learn to ski, however, particularly where physical handicaps are involved. Further, some persons who may not have time to learn to ski would still like to periodically enjoy riding down a hill like a skier but without having to stand up and balance on a pair of skis.

Attempts have been made in the prior art to provide such an apparatus. A ski sled is shown in the Nuss U.S. Pat. No. 3,107,923 issued Oct. 22, 1963. That ski sled has a mechanism for twisting the front portions of the skis to steer the ski sled. No braking mechanism is shown. A snow shuttle is disclosed in the Chilzer U.S. Pat. No. 4,349,209 issued Sep. 14, 1982. That snow shuttle has a single, rather wide runner at the rear and a front runner which can be pivoted with respect to the rear runner for steering purposes, the rear runner having a braking member associated therewith. The Chilzer snow shuttle is more like a conventional sled and would not offer the thrills skiing. A ski maneuvering apparatus having brackets connecting the skis for steering the skis, but without a seating platform or braking mechanism, is shown in the Zepkowski U.S. Pat. No. 4,357,036 issued Nov. 2, 1982. Various other mechanisms can be found in the prior art, but all have drawbacks similar to those mentioned above.

SUMMARY OF THE INVENTION

The present invention is a ski sled which provides comfortable seating to an operator seated generally above the midpoint of two parallel skis which are pivotally connected so that the operator can move a steering frame assembly connected to the skis to tilt both skis along their entire lengths to thereby steer the ski sled while at the same time being able to operate a brake member having a control mechanism associated with the steering frame. Thus, an operator can experience the thrill of skiing combined with the relative ease of operation of a sled.

These and various other advantages and features of novelty which characterize the invention are pointed out with particularly in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DESCRIPTION OF THE PREFERRED EMBODIMENT

Figure 1:
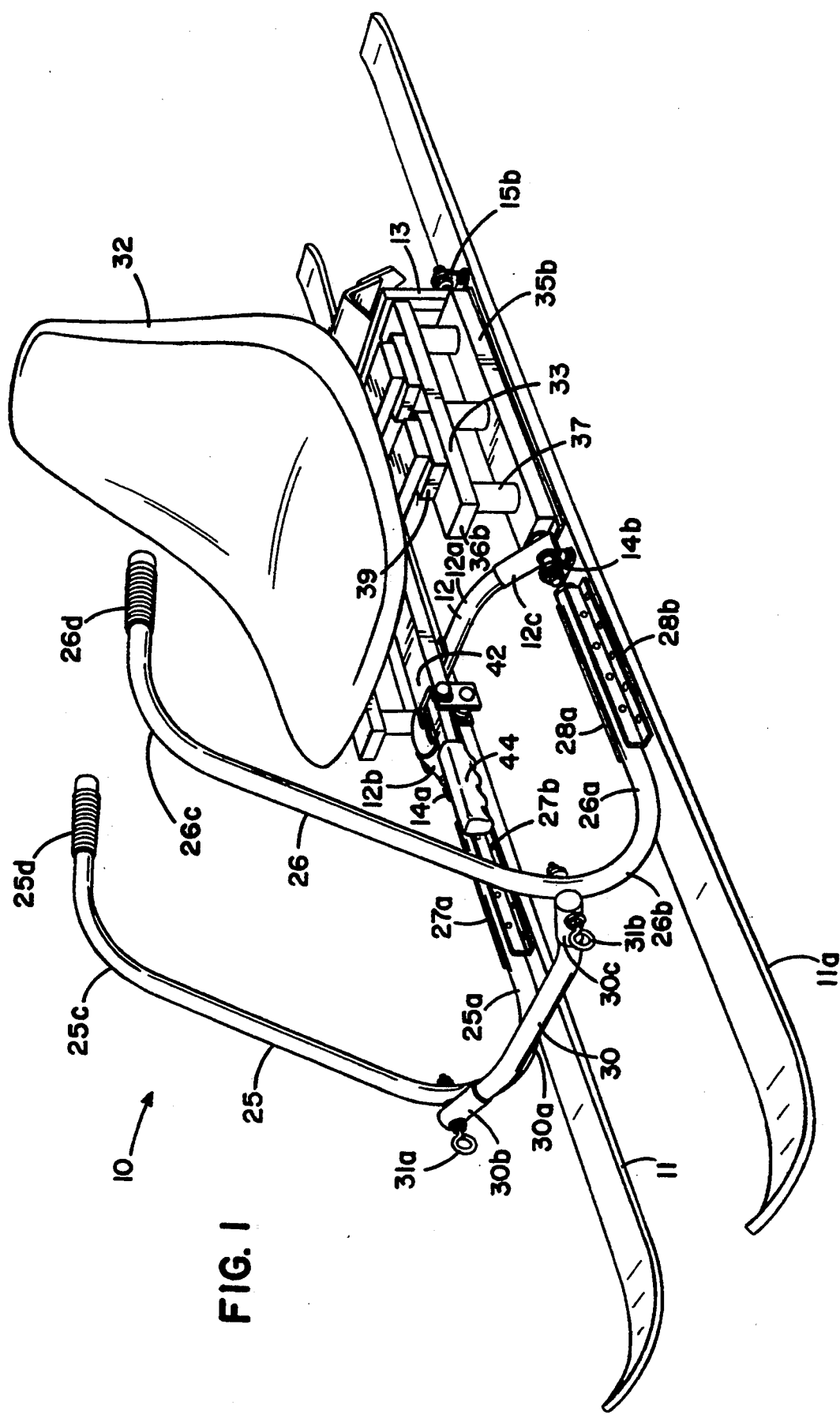
FIG. 1 is a top and left front side perspective view of a ski sled according to the present invention.

Referring now to the drawings, wherein like reference numerals are used throughout the several views to identify like elements of the invention, there is disclosed in FIG. 1 a ski sled 10 having a pair of spaced, parallel skis 11, 11a. The skis are connected by a pair of spaced frame members 12 and 13. Front frame member 12 is a metal tubular member having an elongated central portion 12a and downwardly curved end portions 12b, 12c. End portions 12b, 12c are covered with plastic end caps and are pivotally connected at their respective ends to skis 11, 11a by identical mounting brackets 14a, 14b.

Rear frame member 13 is also a metal tubular member, but has a square cross section, and comprises an elongated central portion 13a and end portions 13b, 13c extending at right angles with respect to central portion 13a. The ends of end portions 13b, 13c are again pivotally connected to skis 11, 11a by means of identical mounting brackets 15a, 15b.

Figure 5:
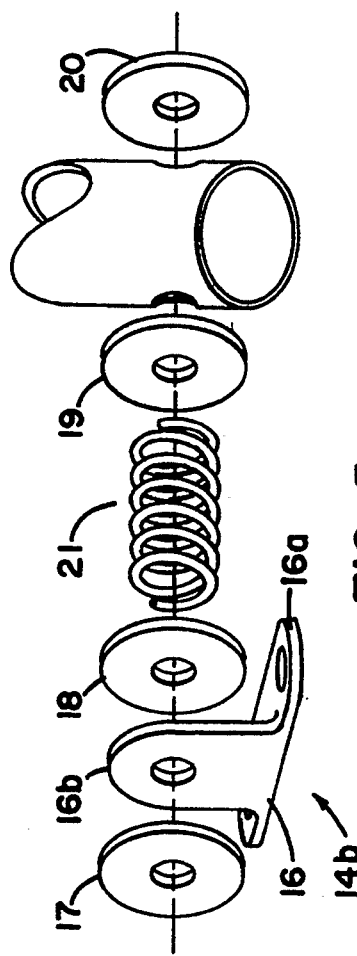
FIG. 5 is an enlarged, exploded fragmentary view of a cross frame mounting bracket.

Each of the four mounting brackets are constructed as shown in FIG. 5, which is an enlarged exploded view of mounting bracket 14b. The mounting bracket consists of an L-shaped support member 16 having a bottom plate 16a which is attached to the ski by screws, and an upstanding flat portion 16b having a hole therein. Washers 17 and 18 are positioned on opposite sides of flat portion 16b and washers 19 and 20 are positioned on opposite sides of frame member end portion 12b, which is also provided with an opening aligned with the openings in the washers and flat portion 16b. A coil spring 21 is positioned between washers 18 and 19 to keep tension on mounting bracket elements. A lag bolt extending axially with respect to the ski through the elements shown in FIG. 5, is used to connect the mounting bracket elements to bottom support member 35B. Both ends of each of the frame members 12 and 13 are connected to the skis in this fashion so that the skis 11, 11a can freely pivot about the mounting bolts as shown, for example, in FIG. 8.

Ski sled 10 is provided with a steering frame assembly which includes a pair of steering members 25, 26. Steering members 25, 26 have the same shape and are both tubular, somewhat U-shaped curved members each having elongated lower end portions 25a, 26a positioned along the tops of the skis 11, 11a in front of the front frame member 12, each being rigidly secured to the ski by a pair of spaced angle irons 27a, 27b on ski 11 and 28a, 28b on ski 11a. The angle irons are each provided with a series of holes for attaching them to the skis by means of screws and to the lower end portions 25a, 26a by means of bolts extending through those holes and corresponding holes in the end portions.

The steering members 25, 26 further comprise curved front portions 25b, 26b curving forwardly, upwardly and then rearwardly from the lower end portions 25a, 26a, and upwardly and also rearwardly extending elongated portions 25c, 26c extending therefrom, and rearwardly extending handle portions 25d, 26d at the upper ends of the steering members.

Figure 8:
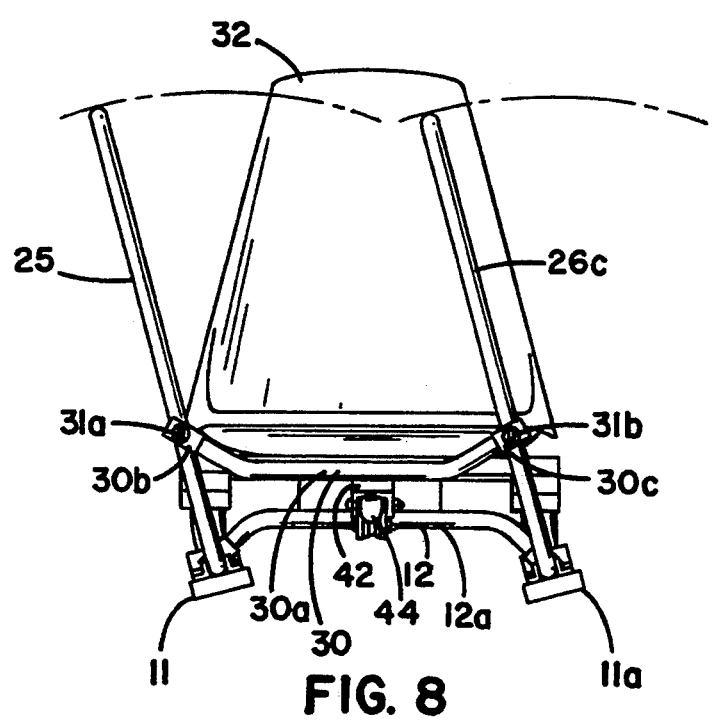
FIG. 8 is a front view thereof showing the steering frame assembly and skis tilted with respect to the seat platform.

Steering members 25, 26 are held in a spaced, parallel relationship by a cross member 30 which is a tubular member having an elongated generally straight central portion 30a and opposite end portions 30b, 30c covered with plastic end caps which each extend upwardly at an angle of about 45 degrees with respect to the central portion. Cross member 30 is pivotally secured to steering members 25, 26 at opposite ends thereof by means of threaded bolts extending through openings in end portions 30a, 30b and steering members 25, 26. The connecting bolts 31a, 31b extend axially with respect to the skis and are connected to the steering members generally at the intersections between curved front portions 25b, 26b and the elongated portions 25c, 26c. Because steering members 25, 26 are rigidly connected to skis 11, 11a and are pivotally connected by means of cross member 30, they can be moved from left to right to pivot the skis one way or the other again generally as shown in FIG. 8.

Figure 4:
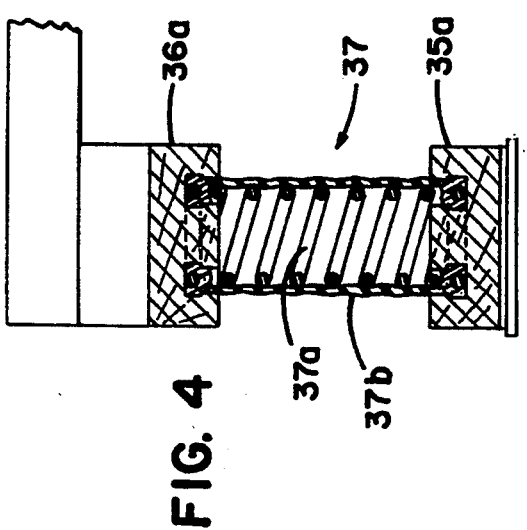
FIG. 4 is an enlarged fragmentary sectional view taken generally along Line 4—4 of FIG. 3.
Figure 6:
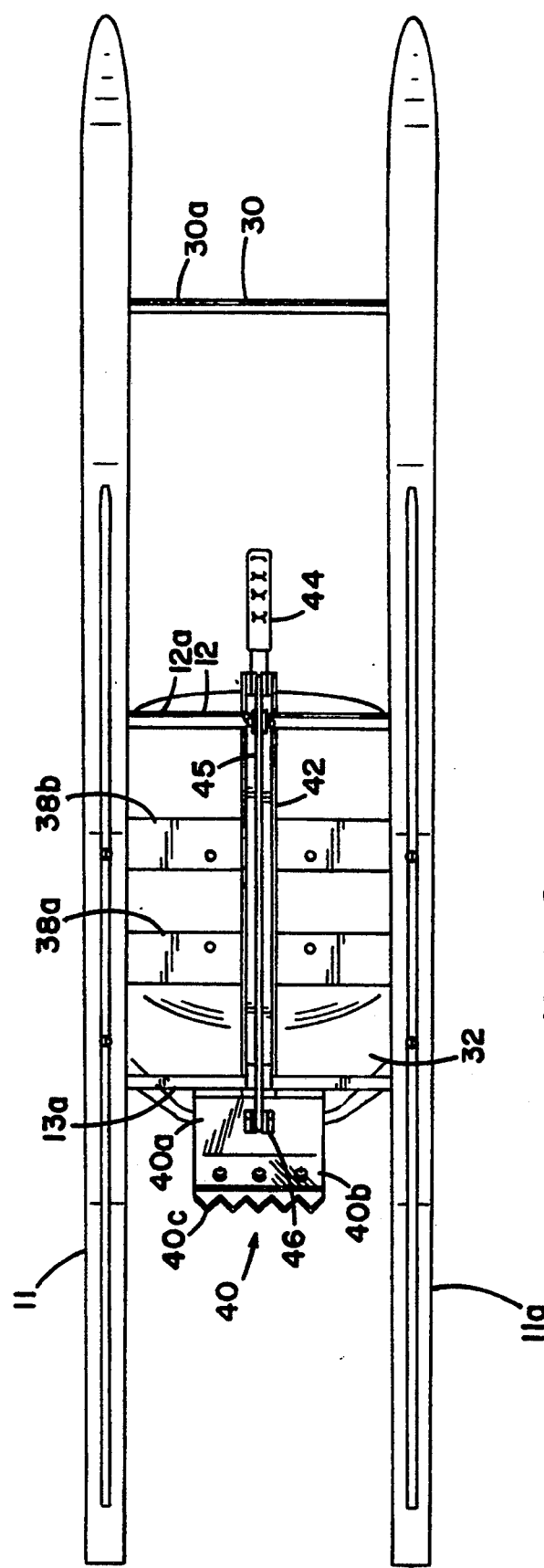
FIG. 6 is a bottom plan view of the ski sled.
Figure 7:
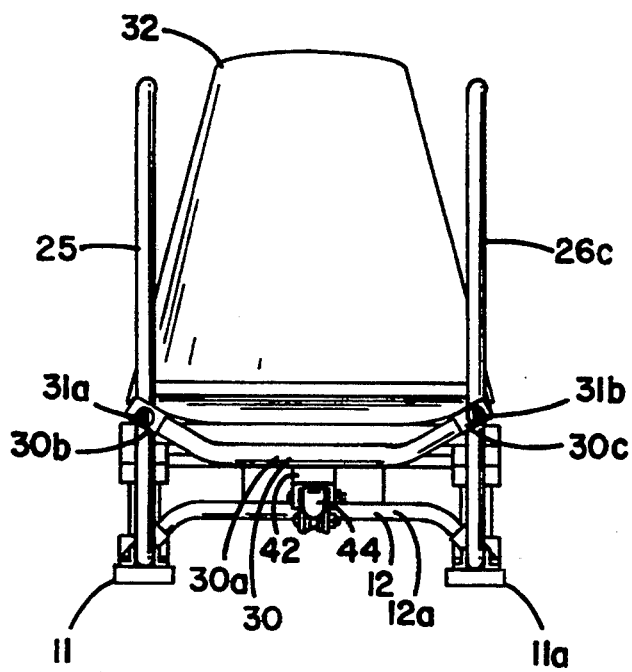
FIG. 7 is a front view thereof.

The ski sled also includes a seat 32 mounted on a seat platform 33 between the front and rear frame members 12 and 13. In the preferred embodiment, platform 33 is constructed from pieces of wooden lumber including a pair of bottom support members 35a, 35b which are one inch wooden boards about the same width as the respective ski and which are secured to the tops of the skis by screws shown in FIG. 6. A neoprene cushion 22 of suitable density is positioned between bottom support members 35a, 35b and skis 11, 11a to compensate for arched upper surfaces of skis 11, 11a and flat bottom surfaces of bottom support members 35a and 35b. Positioned above and in parallel spaced relationship with the bottom support members 35a, 35b are similarly shaped top support members 36a, 36b. The top and bottom support members are connected by a plurality of flexible support members 37 on each side. Referring to FIG. 4, it can be seen that each support member 37 comprises a vertically oriented coiled spring 37a having its top end embedded in an opening in top support member 36a and a bottom end extending into an opening in bottom support member 35a. Spring 37a is covered by a length of rubber tubing 37b. The opposite ends of both the spring 37a and the tubular member 37b extend into the annular openings in the wooden members 35a, 36b and are secured therein by means of a suitable adhesive.

In the preferred embodiment shown in the drawings, there are three flexible support members 37 on each side which are evenly spaced along the respective skis. The seat platform further includes a pair of seat support members 38, 38a, 38b extending between and connected to top support members 36a, 36b but spaced therefrom by means of small spacer blocks 39. Seat 32 is rigidly connected to the cross members 38a, 38b so that an operator can sit in the seat 32, place his or her feet on cross member 30 and thereby be in a position to operate the handles 25d, 26d. Flexible support members 37 serve a dual function, acting not only as springs to cushion the ride but also flexing to permit the skis to tilt with respect to the seat platform 33, again as shown in FIG. 8. As the skis are tilted to the left or right by the operator moving the steering frame assembly 25, 26, ski sled 10 will turn in the direction that the steering frame assembly and skis are tilted but the seat 32 will remain in a generally upright position because of the flexibility of the support member 37.

Figure 2:
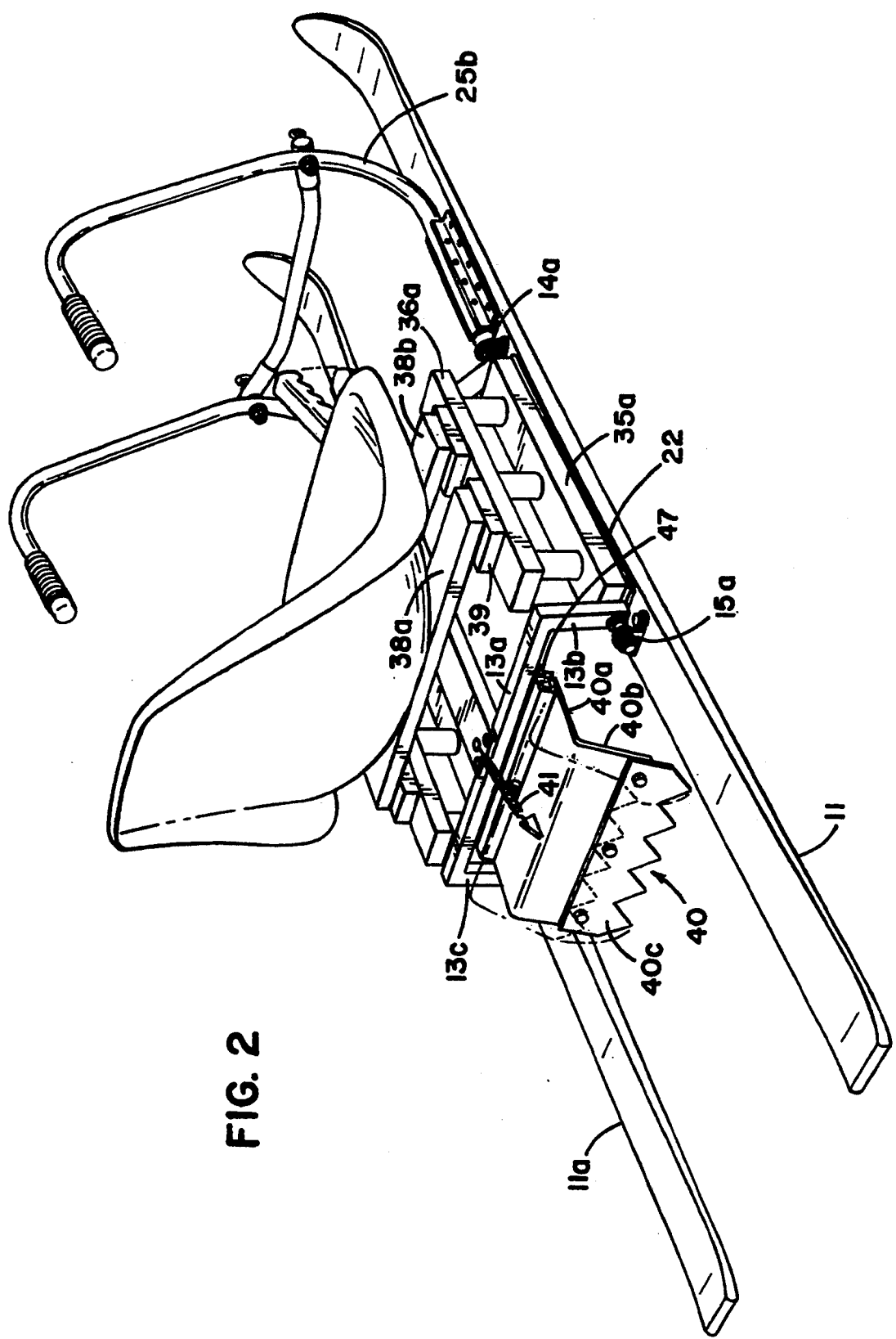
FIG. 2 is a top and right rear side perspective view of the ski sled.
Figure 3:
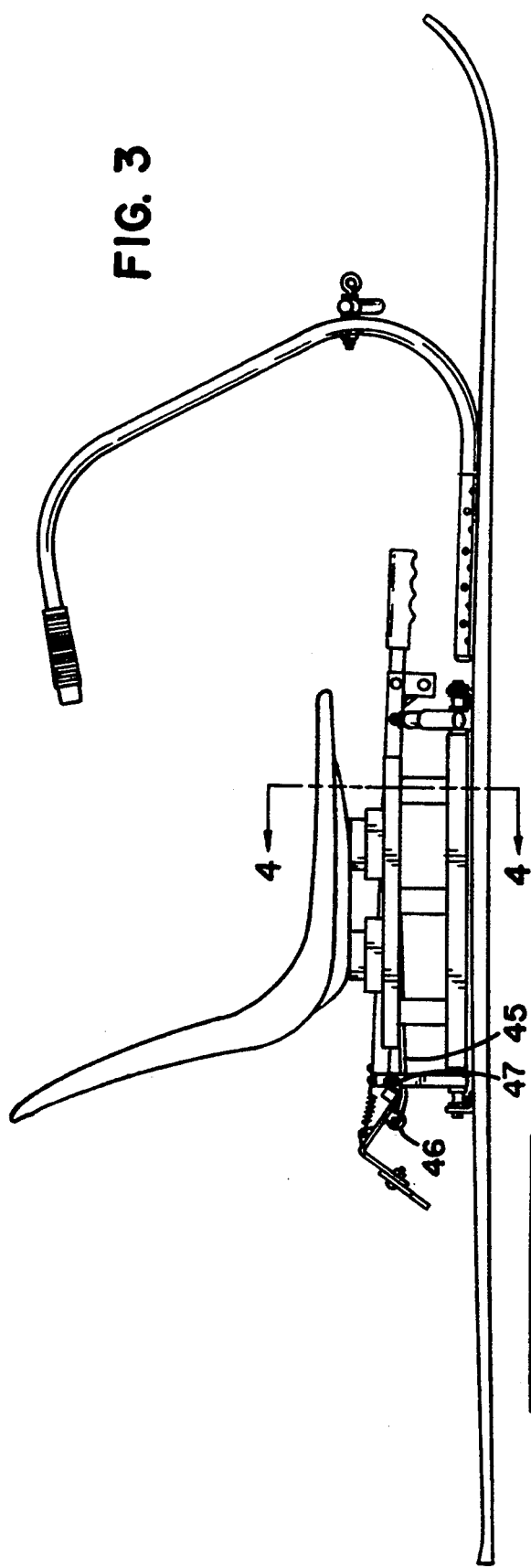
FIG. 3 is a side elevational view thereof.

Ski sled 10 also has a brake member 40 which is mounted with an aluminum piano hinge 47 for upward and downward pivotal movements to rear frame member 13, as best shown in FIG. 2. Brake member 40 is made from a flat piece of aluminum bent into a generally L-shaped configuration having an upper generally horizontally extending flat portion 40a and a generally downwardly extending flat portion 40b to the end of which is attached a hardened steel portion 40c having a serrated bottom edge for engagement with the ground surface. The upper end of portion 40a is pivotally connected to rear frame member 13 so that brake member 40 can move between a lower ground engaging position and a raised position (shown in phantom). Brake member 40 is normally held in the raised position by means of a spring 41 connected between brake member 40 and rear frame member 13. Extending forwardly from a connection with rear frame member 13 and extending over and attached to front frame member 12 is a brake handle support member 42 which at its front end has a brake handle 44 pivotally attached thereto for upward and downward movements by the operator. Brake handle 44 is a generally L-shaped member having a short leg extending downwardly from the pivotal attachment to member 42. A cable 45 is connected between the bottom end of the short leg and a bracket 46 on the bottom side of portion 40a of brake member 40. When the handle 44 is pulled upwardly by the operator, the short leg of the brake member moves forwardly in an arc about a pivot point in 42 positioned above frame member 12 to pull the cable forwardly and thus draw brake member 40 downwardly into engagement with the snow or ground surface between the skis. In this matter the operator can affectively slow or stop the ski sled when it becomes necessary or desirable to do so.

The ski sled of the present invention permits an operator to be comfortably seated on seat 32 with his or her feet supported either on the skis or on cross member 30 with hands free to operate the steering frame assembly and the brake. The ski sled will respond by turning in the direction that the steering frame assembly and skis are tilted but at the same time, the operator remains seated generally upright and at any time the operator can operate the brake to slow down or stop the ski sled. The springs which comprise part of the seat platform also function to provide a smoother ride than sleds where there is a direct connection between the seat and the runners. My invention thus provides an opportunity for entertainment to many persons who for one reason or another cannot ski.

What is claimed is:

1. A ski sled, comprising:
   (a) a pair of spaced, parallel skis;
   (b) a pair of longitudinally spaced frame members each having opposite ends pivotally connected to each ski;
   (c) a steering frame assembly comprising a pair of steering members each having a handle portion at an upper end thereof and being rigidly connected to one of said skis at a lower end portion thereof and each steering member being pivotally connected by a transverse frame member permitting transverse pivotal movements thereof to tilt said skis;

(d) a seat platform separate from said spaced frame members mounted between said spaced frame members having first support means mounted to said skis connected by flexible support means to an upper platform portion carrying a seat, said flexible means permitting said skis to be tilted with respect to said upper platform portion;

(e) a brake member mounted on said ski sled for movement into and out of engagement with a ground surface on which said ski sled is operating; and (f) means for moving said brake member into and out of engagement with the ground surface.

2. A ski sled according to claim 1 wherein said brake member is attached to one of said spaced frame members by hinge means.

3. A ski sled according to claim 1 wherein said flexible support means comprise a plurality of vertically oriented coil springs each having an upper end connected to said upper platform portion and a lower end connected to said first support means.

4. A ski sled according to claim 3 wherein said upper and lower ends of said springs extend into openings in said seat platform and are secured therein by adhesive means.

5. A ski sled according to claim 4 wherein said springs are each covered by a length of rubber tubing which also extends into said openings and is secured by said adhesive means.

6. A ski sled, comprising:

(a) a pair of spaced skis;

(b) spaced frame members each having opposite ends pivotally connected to each ski;

(c) a seat mounted on flexible support members attached to said skis to permit said skis to be tilted with respect to said seat, said seat being mounted between said spaced frame members; and (d) a pair of steering members connected to said skis to permit transverse pivotal movements thereof to tilt said skis, said steering members each having a handle portion at an upper end thereof and each rigidly connected to one of said skis at a lower end portion thereof, and are pivotally connected by a transverse member thereby permitting transverse generally parallel movements of said steering members to tilt said skis.

7. A ski sled according to claim 6 including a brake member mounted on said ski sled for movement into and out of engagement with a ground surface on which said ski sled is operating, means for moving said brake member into and out of engagement with the ground surface wherein said spaced frame members include front and rear frame members, and wherein said brake member is mounted to said rear frame member by a hinge.

8. A ski sled according to claim 6 wherein a brake handle is pivotally mounted to means including said front frame member forwardly of said seat, wherein a cable is connected between said brake handle and said brake member to operate said brake member, and wherein a spring is connected between said brake member and said rear frame member to normally hold said brake member out of engagement with a ground surface.

9. A ski sled according to claim 6 wherein said flexible support members comprise a plurality of springs, and wherein means are provided for connecting said springs between said seat and said skis.

10. A ski sled according to claim 9 wherein said springs are each covered by a length of rubber tubing.

* * * * *